(12) United States Patent
Yang

(10) Patent No.: US 8,943,244 B2
(45) Date of Patent: Jan. 27, 2015

(54) MOBILE DEVICE AND USB SYSTEM INCLUDING THE SAME

(71) Applicant: Samsung Electronics Co., Ltd., Suwon-si (KR)

(72) Inventor: Seung-Soo Yang, Hwaseong-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 77 days.

(21) Appl. No.: 13/673,138

(22) Filed: Nov. 9, 2012

(65) Prior Publication Data

US 2013/0238820 A1  Sep. 12, 2013

(30) Foreign Application Priority Data

Mar. 7, 2012 (KR) .................. 10-2012-0023120

(51) Int. Cl.
*G06F 13/12* (2006.01)
*G06F 3/00* (2006.01)

(52) U.S. Cl.
USPC .............................................. 710/62; 710/19

(58) Field of Classification Search
CPC ..... G06F 13/387; G06F 3/038; G06F 13/385; G06F 21/85; G06F 9/455; G06F 1/3215
See application file for complete search history.

(56) References Cited

U.S. PATENT DOCUMENTS

| | | | |
|---|---|---|---|
| 2002/0035621 A1* | 3/2002 | Zintel et al. | 709/220 |
| 2006/0105712 A1* | 5/2006 | Glass et al. | 455/41.2 |
| 2007/0038785 A1* | 2/2007 | Varanda et al. | 710/62 |
| 2009/0198859 A1* | 8/2009 | Orishko et al. | 710/313 |
| 2011/0307906 A1* | 12/2011 | Varanda et al. | 719/323 |
| 2013/0205206 A1* | 8/2013 | Hawver et al. | 715/704 |

FOREIGN PATENT DOCUMENTS

| | | |
|---|---|---|
| JP | 2005-182630 | 7/2005 |
| KR | 1020040090318 | 10/2004 |
| KR | 1020080056963 | 6/2008 |

* cited by examiner

*Primary Examiner* — Hyun Nam
(74) *Attorney, Agent, or Firm* — F. Chau & Associates, LLC (57) ABSTRACT

A mobile device includes a composite processing unit and a device controller driver. The composite processing unit is configured to provide a plurality of functions including a human interface device (HID) emulator function, select at least one activated function of the plurality of functions and automated operation content based on a connection status between the mobile device and a host, and generate client HID data including the automated operation content. The device controller driver is configured to provide the client HID data to the host, and provide event information to the composite processing unit based on the connection status.

20 Claims, 10 Drawing Sheets

| FUNCTION ID | STATUS ID | HOST A_OPERATION | CLIENT A_OPERATION |
|---|---|---|---|
| ID 1 | STATUS_ID11 | OP_LISTH11 | OP_LISTC11 |
| | ⋮ | ⋮ | ⋮ |
| | STATUS_ID1n | OP_LISTH1n | OP_LISTC1n |
| ID 2 | STATUS_ID21 | OP_LISTH21 | OP_LISTC21 |
| | ⋮ | ⋮ | ⋮ |
| | STATUS_ID2n | OP_LISTH2n | OP_LISTC2n |
| ID 3 | STATUS_ID31 | OP_LISTH31 | OP_LISTC31 |
| | ⋮ | ⋮ | ⋮ |
| | STATUS_ID3n | OP_LISTH3n | OP_LISTC3n |
| ⋮ | ⋮ | ⋮ | ⋮ |

MOBILE DEVICE AND USB SYSTEM INCLUDING THE SAME

CROSS-REFERENCE TO RELATED APPLICATIONS

This application claims priority under 35 USC §119 to Korean Patent Application No. 10-2012-0023120, filed on Mar. 7, 2012, the disclosure of which is incorporated by reference in its entirety.

TECHNICAL FIELD

Exemplary embodiments of the present inventive concept relate to a mobile device and a universal serial bus (USB) system including the same.

DISCUSSION OF THE RELATED ART

USB is a standard interface that enables various peripheral devices to be connected to a host device. A composite USB device may provide a plurality of USB functions. A composite USB device may increase the load of the host device.

SUMMARY

Exemplary embodiments of the inventive concept provide a mobile device having composite functions and supporting automated operation.

Exemplary embodiments of the inventive concept provide a USB system including the mobile device.

In an exemplary embodiment, a mobile device includes a composite processing unit and a device controller driver. The composite processing unit is configured to provide a plurality of functions including a human interface device (HID) emulator function, select at least one activated function of the plurality of functions and automated operation content based on a connection status between the mobile device and a host, and generate client HID data including the automated operation content. The device controller driver is configured to provide the client HID data to the host, and provide event information to the composite processing unit based on the connection status.

In an exemplary embodiment, the device controller driver may include a wired device controller driver configured to interface with the host via a wired interface, and a wireless device controller driver configured to interface with the host via a wireless interface.

In an exemplary embodiment, the plurality of functions may include a plurality of universal serial port (USB) functions, and the device controller driver may include a USB device controller driver configured to control a USB interface between the mobile device and the host.

In an exemplary embodiment, the composite processing unit may include a function module including an HID emulator and configured to provide the plurality of functions, an automated operation table that includes host automated operation content and client automated operation content corresponding to the at least one activated function, and based on the connection status, a data transfer logic module that transfers the automated operation content as first HID data to the HID emulator, and an automation processing logic module that controls the function module and the data transfer logic module, and accesses the automated operation table, according to the connection status. The HID emulator may convert the first HID data to the client HID data, which is decipherable by the host, and provide the client HID data to the device controller driver.

The automated operation table may include a plurality of function identifications, each corresponding to one of the plurality of functions, and a plurality of status identifications based on the connection status.

The data transfer logic module may provide the automated operation content as the first HID data to the HID emulator based on the automated operation table and the connection status.

The mobile device may further include an input processing unit which converts a user input to second HID data to be provided to the composite processing unit. The HID emulator may convert the first and second HID data to the client HID data to be provided to the device controller driver.

The device controller driver may provide event information including first event information indicating that the mobile device is connected to the host, second event information indicating that the mobile device is disconnected from the host, or third event information indicating that the mobile device is in the process of being connected to the host.

The composite processing unit may execute an automated operation corresponding to the first event information based on the automated operation table when the composite processing unit receives the first event information.

The composite processing unit may execute an automated operation corresponding to the second event information based on the automated operation table when the composite processing unit receives the second event information.

The composite processing unit may execute an automated operation corresponding to the third event information based on the automated operation table when the composite processing unit receives the third event information.

In an exemplary embodiment, a universal serial bus (USB) system includes a mobile device and a host that is connected to the mobile device through a USB interface. The mobile device includes a composite processing unit which provides a plurality of USB functions including a human interface device (HID) emulator function, selects at least one activated USB function of the plurality of USB functions and corresponding automated operation content based on a connection status between the mobile device and the host, and generates client HID data including the automated operation content. The mobile device further includes a device controller driver which provides the client HID data to the host, and which provides event information to the composite processing unit based on the connection status.

In an exemplary embodiment, the host may include a USB host controller that controls the USB interface, a USB host controller driver that controls the USB host controller, and a device driver unit that includes a plurality of device drivers, each corresponding to one of the plurality of USB functions. A device driver of the plurality of device drivers corresponding to the activated function may be executed when the mobile device and the host are connected.

The mobile device may be one of a smartphone, a personal digital assistant (PDA), a personal multimedia player, and tablet personal computer (PC).

The USB interface may include a wired USB interface, or a wireless ultra wide band (UWB) USB interface.

In an exemplary embodiment, a composite processing unit includes a function module, an automated operation table, a data transfer logic module, and an automation processing logic module. The function module is configured to provide a plurality of functions including a human interface device (HID) emulator function, select at least one activated function of the plurality of functions and corresponding automated operation content based on a connection status with a host device, and generate client HID data including the automated operation content. The automated operation table includes host automated operation content and client automated operation content corresponding to the at least one activated function, and based on the connection status. The data transfer logic module is configured to transfer the automated operation content as first HID data to the function module. The automation processing logic module is configured to control the function module and the data transfer logic module, and access the automated operation table, according to the connection status. The function module is configured to convert the first HID data to the client HID data, and output the client HID data.

In exemplary embodiments, the mobile device including a plurality of USB functions performs automated operations according to at least one activated function and the connection status with the host, and a related program is executed when the mobile device and the host are connected to each other (e.g., via a USB connection). As a result, the load on the system may be reduced, and efficiency of the mobile device may be improved.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Exemplary embodiments of the present inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

Figure 1:
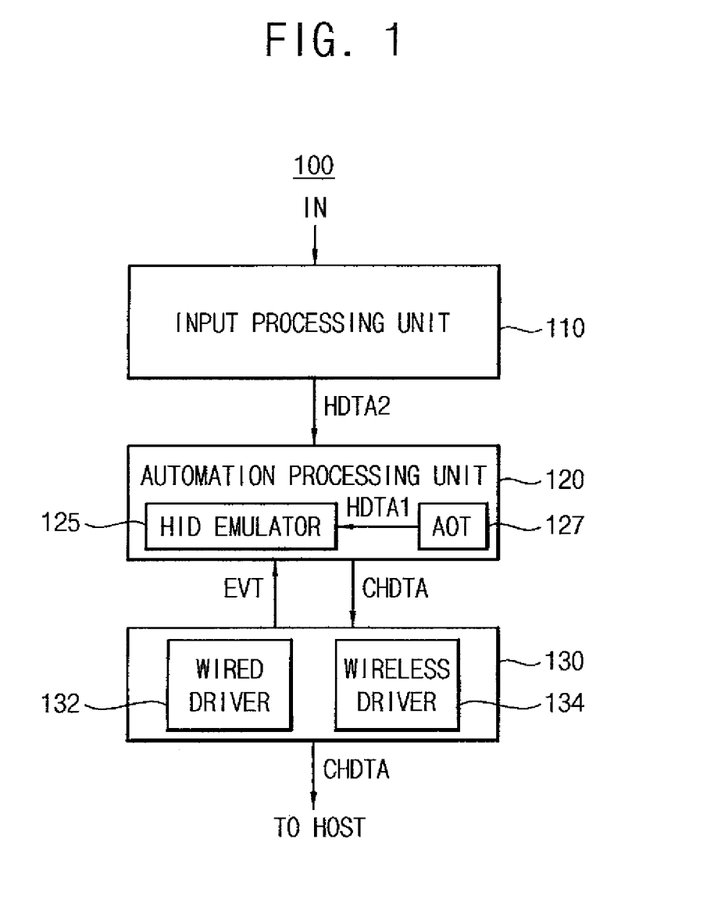
FIG. 1 is a block diagram illustrating a mobile device according to an exemplary embodiment of the inventive concept.

FIG. 1 is a block diagram illustrating a mobile device according to an exemplary embodiment of the inventive concept.

Referring to FIG. 1, a mobile device 100 includes an input processing unit 110, an automation processing unit 120 and a connection communication driver 130. The automation processing unit 120 may include a human interface device (HID) emulator 125 and an automated operation table 127, and the connection communication driver 130 may include a wired communication driver 132 and a wireless communication driver 134.

The input processing unit 110 receives an input signal IN from an input device, and converts the received input signal IN to second HID data HDTA2. The converted second HID data HDTA2 is then provided to the automation processing unit 120. The input device may include, for example, buttons of a keypad, a touch screen, a mouse, a sensor for detecting a motion, a microphone for detecting a voice or a sound, and a camera for detecting an image. The second HID data HDTA2 may include, for example, keyboard values corresponding to commands, raw data values generated when a microphone is used to receive input, or touch screen values and raw data values generated when a camera is used to receive input. The automation processing unit 120 provides the HID emulator 125 with automated operation content. The automated operation content is defined based on a connection status with the host, and is determined using data from the automated operation table as first HID data HDTA1. The HID emulator 125 converts the first HID data HDTA1 to client HID data CHDTA, which is provided to the connection communication driver 130 and transmitted to the host. The client HID data CHDTA conforms to the HID protocol, and is decipherable by the host. The automated operation table may include host automated operations and client automated operations. The host receives the client HID data CHDTA and performs host automated operation(s), such as automated execution of related program(s), according to the automated operation included in the client HID data CHDTA.

The connection communication driver 132 may include at least one of the wired communication driver 132 and the wireless communication driver 134. The wired communication driver 132 may support a wired USB interface, and the wireless communication driver 134 may support a wireless interface such as, for example, a wireless USB interface, Bluetooth, WiFi, Near Field Communication (NFC), Ultra-Wideband UWB, Zigbee®, Radio Frequency (RF), and Worldwide Interoperability for Microwave Access (WiMax).

In an exemplary embodiment, the automation processing unit 120 may include a function block such as a data converting unit that converts raw data from the input processing unit 110 to the second HID data HDTA2, which is then provided to the HID emulator 125. The HID emulator 125 may then convert the second HID data HDTA2 to the client HID data CHDTA, which is provided to the host. In this case, processing the input data and providing the second HID data HDTA2 to the HID emulator 125 may correspond to executing the client automated operation included in the automated operation table 127.

Figure 2:
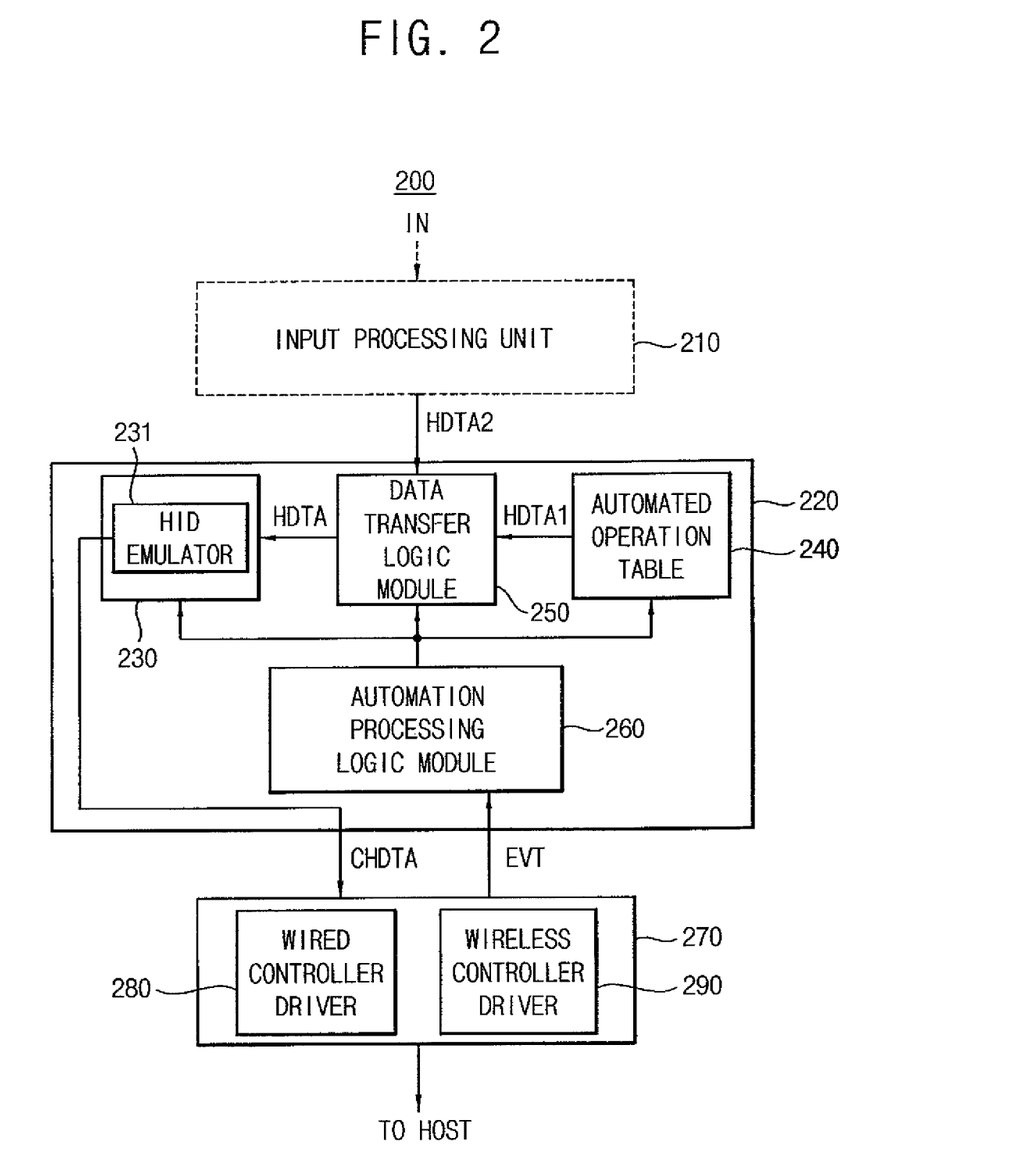
FIG. 2 is a block diagram illustrating a mobile device according to an exemplary embodiment of the inventive concept.

FIG. 2 is a block diagram illustrating a mobile device according to an exemplary embodiment of the inventive concept.

Referring to FIG. 2, a mobile device 200 includes an input processing unit 210, a composite processing unit 220 and a device controller driver 270.

The input processing unit 210 converts an input signal IN received from an input device (e.g., input received from a user) to second HID data HDTA2, which is then provided to the composite processing unit 220.

The composite processing unit 220 may include a USB function module 230, a data transfer logic module 250, an automated operation table 240 and an automation processing logic module 260. The USB function module 230 may be utilized to implement a plurality of USB functions. For example, the USB function module 230 may include an HID emulator 231 that implements an HID emulator function, in addition to other USB functions. The composite processing unit 220 selects an activated function of the plurality of USB functions and automated operation content based on the connection status of the mobile device 200 with the host, and provides client HID data CHDTA including the automated operation content to the device controller driver 270.

The device controller driver 270 provides the client HID data CHDTA to the host and controls an interface with the host. In addition, the device controller driver 270 may provide the composite processing unit 220 with event information EVT corresponding to an event and based on the connection status of the mobile device 200 with the host. For example, the device controller driver 270 may provide the automation processing logic module 260 in the composite processing unit 220 with the event information EVT based on the connection status of the mobile device 200 with the host. The device controller driver 270 includes at least one of a wired device controller driver 280 that supports a wired interface with the host, and a wireless device controller driver 290 that supports a wireless interface with the host.

Figure 3:
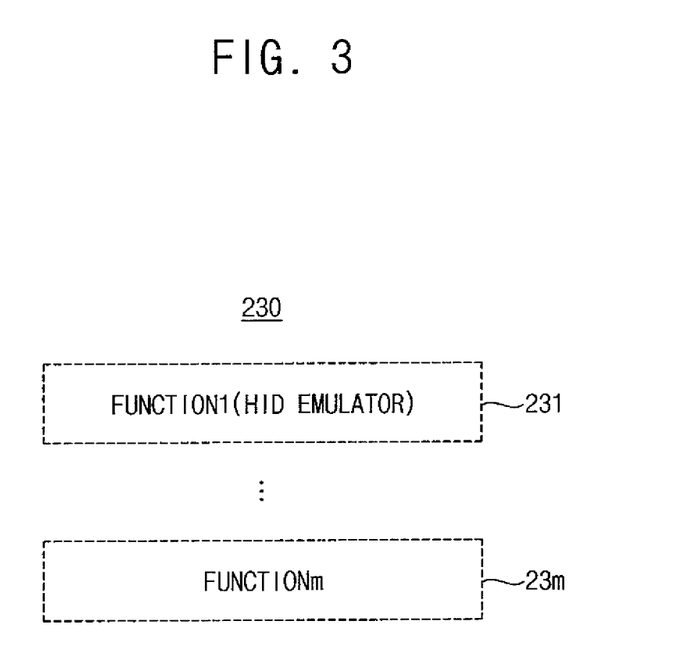
FIG. 3 is a block diagram illustrating an example of the USB function module of FIG. 2 according to an exemplary embodiment of the inventive concept.

FIG. 3 is a block diagram illustrating an example of the USB function module of FIG. 2 according to an exemplary embodiment of the inventive concept.

Referring to FIG. 3, the USB function module 230 includes a plurality of functions 231~23m. The first function 231 may correspond to an HID emulator function. For example, the plurality of functions 231~23m may correspond to a plurality of USB functions that are supported by the standard USB specification. In addition, the device controller driver 270 shown in FIG. 2 may include a USB device controller driver, the wired device controller driver 280 may include a wired USB device controller driver, and the wireless device controller driver 290 may include a wireless USB device controller driver.

Figure 4:
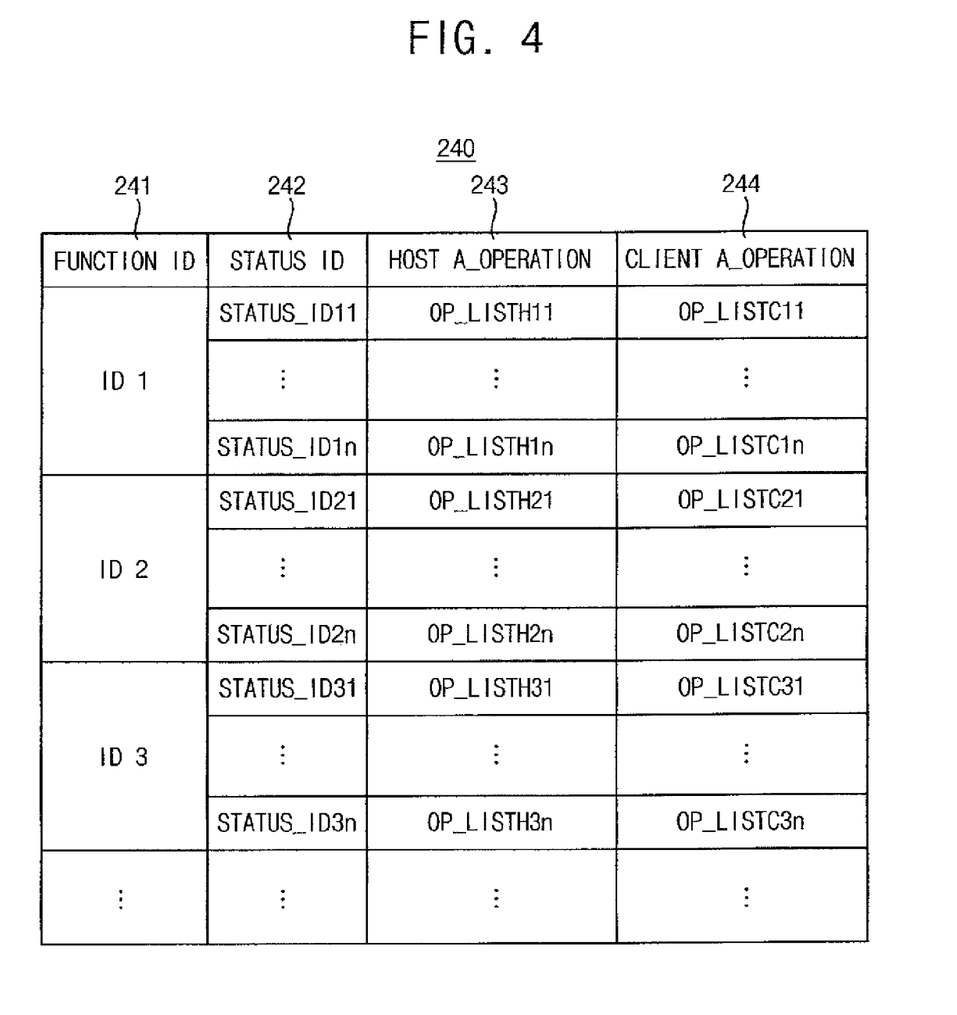
FIG. 4 illustrates an example of the automated operation table of FIG. 2 according to an exemplary embodiment of the inventive concept.

FIG. 4 illustrates an example of the automated operation table of FIG. 2 according to an exemplary embodiment.

Referring to FIG. 4, the automated operation table 240 includes a function identification (ID) 241 indicating each of the plurality of functions 231~23m, a status ID 242 indicating the connection status with the host, host automated operation content 243 designating a host automated operation according to the connection status with the host and a client (e.g., the mobile device 200), and client automated operation content 244 designating a client automated operation according to the connection status with the host. The function ID 241 may include a plurality of IDs (e.g., ID1, ID2, . . . ) indicating at least one activated function of the plurality of functions 231~23m. The status ID 242 may include a plurality of status IDs (e.g., STATUS_ID11~STATUS_ID_1n, STATUS_ID21~STATUS_ID2n, STATUS_ID31_STATUS_ID3n, . . . ) indicating at least one activated function of the plurality of the functions 231~23m according to the connection status with the host. The host automated operation content 243 may include content (e.g., OP_LISTH11~OP_LISTH1n, OP_LISTH21~OP_LISTH2n, OP_LISTH31~ LISTH3n, . . . ) according to the connection status with the host. The client automated operation content 244 may include content (e.g., OP_LISTC11~OP_LISTC1n, OP_LISTC21~ OPLISTC2n, OP_LISTH31~OP_LISTH3n . . . ) according to the connection status with the host.

The client automated operation content 244 corresponds to a particular program being automatically executed in the mobile device 200, or the mobile device 200 automatically executing a particular program according to the connection status of the mobile device 200 with the host.

Hereinafter, various operations of the mobile device 200 will be described with reference to FIGS. 2 through 4. It is to be appreciated that the operations described herein are exemplary, and the mobile device 200 is not limited to performing the operations described herein.

In an exemplary embodiment, when the mobile device 200 is a smartphone and the mobile device 200 is connected to the host while a USB serial function of the plurality of functions 231~23m is activated, the mobile device 200 receives a Configuration Set message from the host, and the automation processing logic module 260 checks the automated operation content OP_LISTH21 and OP_LISTC21 in the automated operation table 240 when the USB serial function ID2 is connected to the host (STATUS_ID21). In this case, there is no input from the user, and the automation processing logic module 260 accesses the automated operation table 240 and transfers the host automated operation content OP_LISTH21 to the data transfer logic module 250 as the first HID data HDTA1. The data transfer logic module 250 transfers the host automated operation content OP_LISTH21 to the HID emulator 231 as HID data HDTA. The HID emulator 231 converts the HID data HDTA including the host automated operation content OP_LISTH21 to the client HID data CHDTA, which conforms with the HID protocol, and provides the client HID data CHDTA to the device controller driver 270. The device controller driver 270 then provides the client HID data CHDTA to the host. For example, the host may receive the client HID data CHDTA, and a phone managing program (e.g., phonemanager.exe) may be automatically executed at the host according to the host automated operation content OP_LISTH21 included in the client HID data CHDTA. That is, the phone managing program may be executed in a Windows® environment as the result of keyboard values corresponding to "Start-Run Command(window key+r)+c\program\phonemanager.exe[Enter]" included in the automated operation content OP_LISTH21, which executes the phone managing program (e.g., phonemanager.exe).

When the mobile device 200 is a smartphone and the mobile device 200 is connected to the host while a media transfer protocol (MTP) function of the plurality of functions 231~23m is activated, a media player application program is automatically executed at the host according to the host automated operation content.

In an exemplary embodiment, when the mobile device 200 is a smartphone and the mobile device 200 is connected to the host while a user authentication function of the plurality of functions 231~23m is activated, the mobile device 200 receives a Configuration Set message from the host and the automation processing logic module 260 checks the automated operation content OP_LISTH31 and OP_LISTC31 in the automated operation table 240 when the user authentication function ID3 is connected to the host (STATUSJD31). In this case, there is no input from the user, the automation processing logic module 260 controls the automated operation table 240 such that the host automated operation content OP_LISTH31 is transferred from the automated operation table 240 to the data transfer logic module 250 as the first HID data HDTA1, and the data transfer logic module 250 transfers the host automated operation content OP_LISTH31 to the HID emulator 231 as HID data HDTA. The HID emulator 231 converts the HID data HDTA including the host automated operation content OP_LISTH31 to the client HID data CHDTA, which conforms with the HID protocol, and provides the client HID data CHDTA to the device controller driver 270. The device controller driver 270 then provides the client HID data CHDTA to the host. For example, the host may receive the client HID data CHDTA, and a user authentication program (e.g., secureuser.exe) may be automatically executed at the host according to the host automated operation content OP_LISTH31 included in the client HID data CHDTA. That is, the user authentication program may be executed in a Windows® environment as the result of keyboard values corresponding to "Start-Run Command(window key+r)+c\program\secureuser.exe[Enter]" included in the host automated operation content OP_LISTH21, which executes the user authentication program (e.g., secureuser-.exe).

In an exemplary embodiment, when the user authentication program (e.g., secureuser.exe) is automatically executed, the user authentication program displays a window directing the user to input authentication data. The automation processing logic module 260 executes a smartphone authentication program at the mobile device 200 that receives input from the user for user authentication. The program transfers the input received from the user to the input processing unit 210, and the input processing unit 210 converts the input received from the user to the second HID data HDTA2 and provides the second HID data HDTA2 to the HID emulator 231 through the data transfer logic module 250. The HID emulator 231 converts the second HID data HDTA2 to the client HID data CHDTA, which is decipherable by the host, and provides the client HID data CHDTA to the host through the device controller driver 270. The user authentication program (e.g., secureuser.exe) at the host analyzes the client HID data CHDTA including the input signal received from the user, and performs user authentication.

When the user is authenticated and the user authentication program (e.g., secureuser.exe) displays a message that the authentication is successful, the user disconnects the mobile device 200 from the host. When the user disconnects the mobile device 200 from the host, the host automated operation content OP_LISTH31 indicating that the user authentication program (e.g., secureuser.exe) has ended is provided to the host as the first HID data HDTA1, and the authentication program (e.g., secureuser.exe) ends at the host.

In an exemplary embodiment, when the mobile device 200 is a smartphone, the host is a smart television, and the mobile device 200 is connected to the host while a television function of the plurality of functions 231~23m is activated, the composite processing unit 220 executes an application program for the smart television. For example, the user may input content relating to a target program (e.g., a program title) via the input processing unit 210. The content may be input via the input processing unit 210 by, for example, typing a title of the target program using a keyboard or keypad, or speaking the title of the target program into a microphone. The content is then converted to the second HID data HDTA2 at the input processing unit 210, and the second HID data HDTA2 is transferred to the HID emulator 231 via the data transfer logic module 250. The HID emulator 231 converts the second HID data HDTA2 to the client HID data CHDTA, which is decipherable by the host, and provides the client HID data CHDTA to the host via the device controller driver 270. The host (e.g., a smart television) receives the client HID data CHDTA, searches for the target program using the second HID data HDTA2 included in the client HID data CHDTA, and displays search results.

Figure 5:
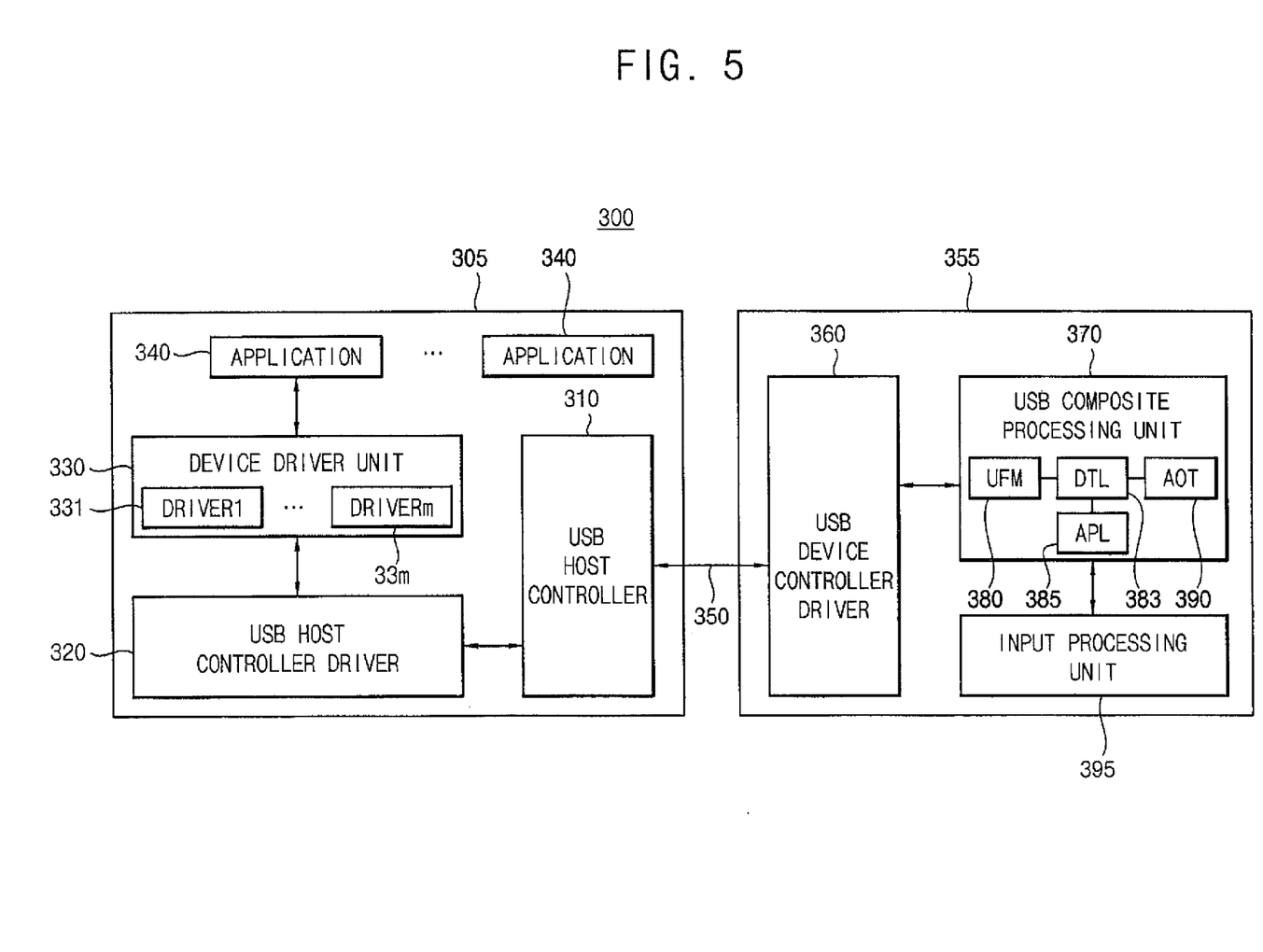
FIG. 5 is a block diagram illustrating a USB system according to an exemplary embodiment of the inventive concept.

FIG. 5 is a block diagram illustrating a USB system according to an exemplary embodiment of the inventive concept.

Referring to FIG. 5, a USB system 300 includes a host 305 and a mobile device 355. The host 305 and the mobile device 355 are connected to each other through a USB interconnect 350.

The host 305 includes a USB host controller 310, a USB host controller driver 320, a device driver unit 330 and a plurality of applications 340. The mobile device 355 includes a USB device controller driver 360, a USB composite processing unit 370 and an input processing unit 395. The USB host controller driver 320 controls the USB host controller 310.

The device driver unit 330 includes a plurality of device drivers 331~33m, and the USB composite processing unit 370 includes a USB function module 380, a data transfer logic module 383, an automated operation table 390 and an automation processing logic module 385. The USB function module 380 may include a plurality of USB functions including, for example, an HID emulator function as described with reference to FIG. 3.

The input processing unit 395 converts an input signal IN received from an input device (e.g., an input received from a user) to second HID data HDTA2, which is then provided to the USB composite processing unit 370. The USB composite processing unit 370 selects an activated function of the plurality of USB functions and automated operation content based on the connection status of the mobile device 355 with the host 305, and provides first HID data HDTA1 including the automated operation content to the HID emulator. The HID emulator converts the first HID data HDTA1 to client HID data CHDTA, which is provided to the USB device controller driver 360. The USB device controller driver 360 provides the client HID data CHDTA to the USB host controller 310 through the USB interconnect 350. The USB host controller 310 controls the USB interface at the host 305, and provides the client HID data CHDTA to a corresponding device driver in the device driver unit 330 through the USB host controller driver 320. The corresponding device driver receives the client HID data, analyzes the client HID data, and controls a corresponding application such that the host automated operation included in the client HID data is executed at the host 305.

The USB device controller driver 360 provides the USB composite processing unit 370 with event information corresponding to an event according to the connection status of the mobile device 355 with the host 305. The automated processing logic module 385 in the USB composite processing unit 370 accesses the automated operation table 390 and transfers the automated operation content, based on the event information and the connection status of the mobile device 355 with the host 305, to the HID emulator in the USB function module 380.

Figure 6:
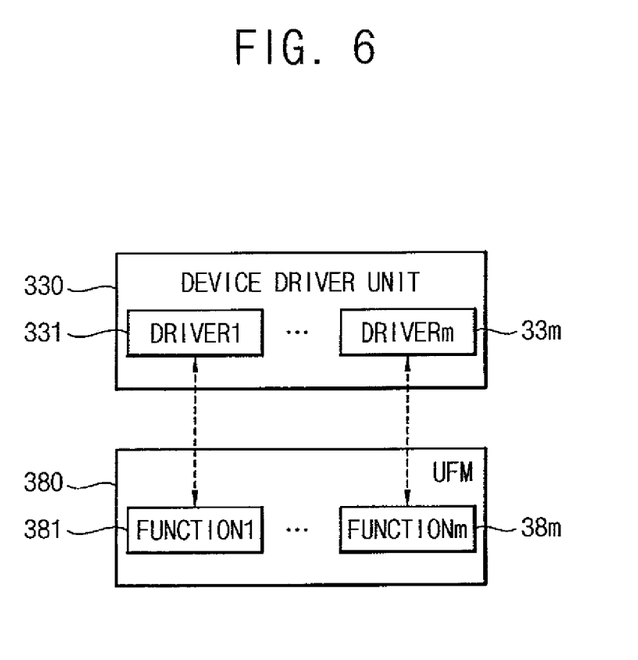
FIG. 6 illustrates the relationship between the device driver unit in the host and the USB function module in the mobile device according to an exemplary embodiment of the inventive concept.

FIG. 6 illustrates the relationship between the device driver unit in the host and the USB function module in the mobile device according to an exemplary embodiment of the inventive concept.

Referring to FIG. 6, the device driver unit 330 may include the plurality of device drivers 331~33m, and the USB function module 380 may include a plurality of USB functions 381~38m. In an exemplary embodiment, each of the plurality of device drivers 331~33m may correspond to each of the plurality of USB functions 381~38m.

In an exemplary embodiment, each of the plurality of device drivers 331~33m may correspond to two or more functions of the plurality of USB functions 381~38m.

Figure 7:
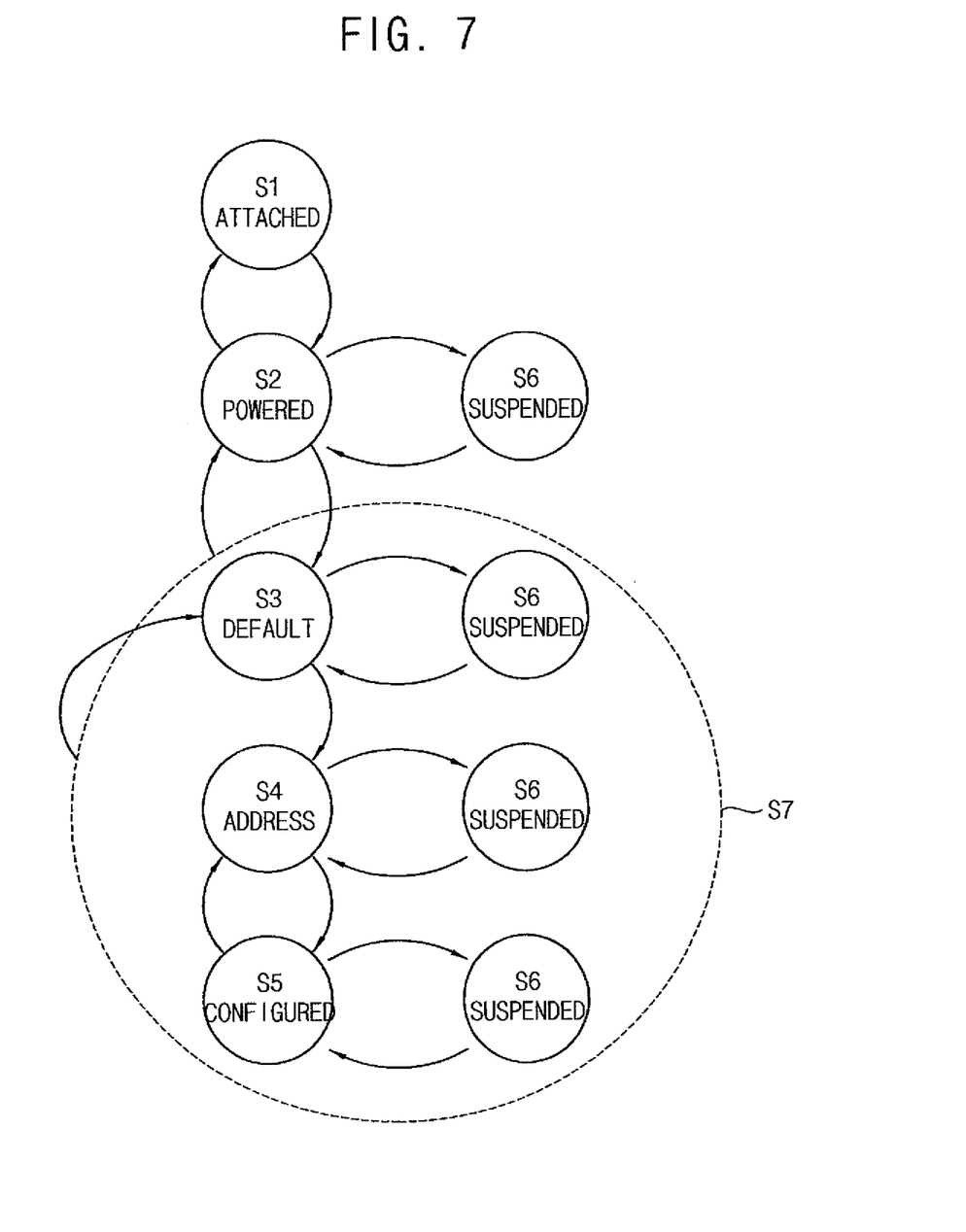
FIG. 7 illustrates a connection status of the mobile device with the host according to an exemplary embodiment of the inventive concept.

FIG. 7 illustrates a connection status of the mobile device with the host according to an exemplary embodiment of the inventive concept.

Referring to FIG. 7, the mobile device 355 may have one of states S1~S6, according to the connection status with the host 305. In attached state S1, the mobile device 355 is connected to the host 305. In powered state S2, the mobile device 355 is connected to the host 305 and is powered by the host 305. In default state S3, the mobile device 355 is connected to the host 305, is powered by the host 305, and is reset. In address state S4, the mobile device 355 is connected to the host 305, is powered by the host 305, is reset, and has a unique address assigned to it. In configured state S5, the mobile device 355 is connected to the host 305, is powered by the host 305, is reset, has a unique address assigned to it, and is configured. In suspended state S6, the mobile device 355 is configured, and bus activity is idle during a predetermined time.

The various states of the mobile device 355 are described herein according to an exemplary embodiment of the inventive concept. The mobile device 355 transitions from S1 to S2 when a hub is configured, and the mobile device 355 transitions from S2 to S1 when the hub is reset or deconfigured. The mobile device 355 transitions from S2 to S3 when the mobile device 355 is reset. The mobile device 355 transitions from S3 to S4 when an address is assigned to the mobile device 355. The mobile device 355 transitions from S4 to S5 when the mobile device 355 is configured. When the mobile device 355 transitions to S5, the host 305 may use functions provided by the mobile device 355. The mobile device 355 transitions from S5 to S4 when the mobile device 355 is deconfigured. The mobile device 355 transitions from S2~S5 to S6 when the bus is idle during a predetermined time. The mobile device 355 transitions from S6 to each of S2~S5 when bus activity is detected. The mobile device 355 transitions from S7 to S3 when the mobile device 355 is reset, and transitions from S7 to S2 when a power interruption occurs. Referring to FIG. 5, the USB device controller driver 360 provides the USB composite processing unit 370 with event information corresponding to an event according to the current state of the mobile device 355. The USB composite processing unit 370 accesses the automated operation table 390 and transfers automated operation content according to the state of the mobile device 355 the HID emulator in the USB function module 380.

Figure 8:
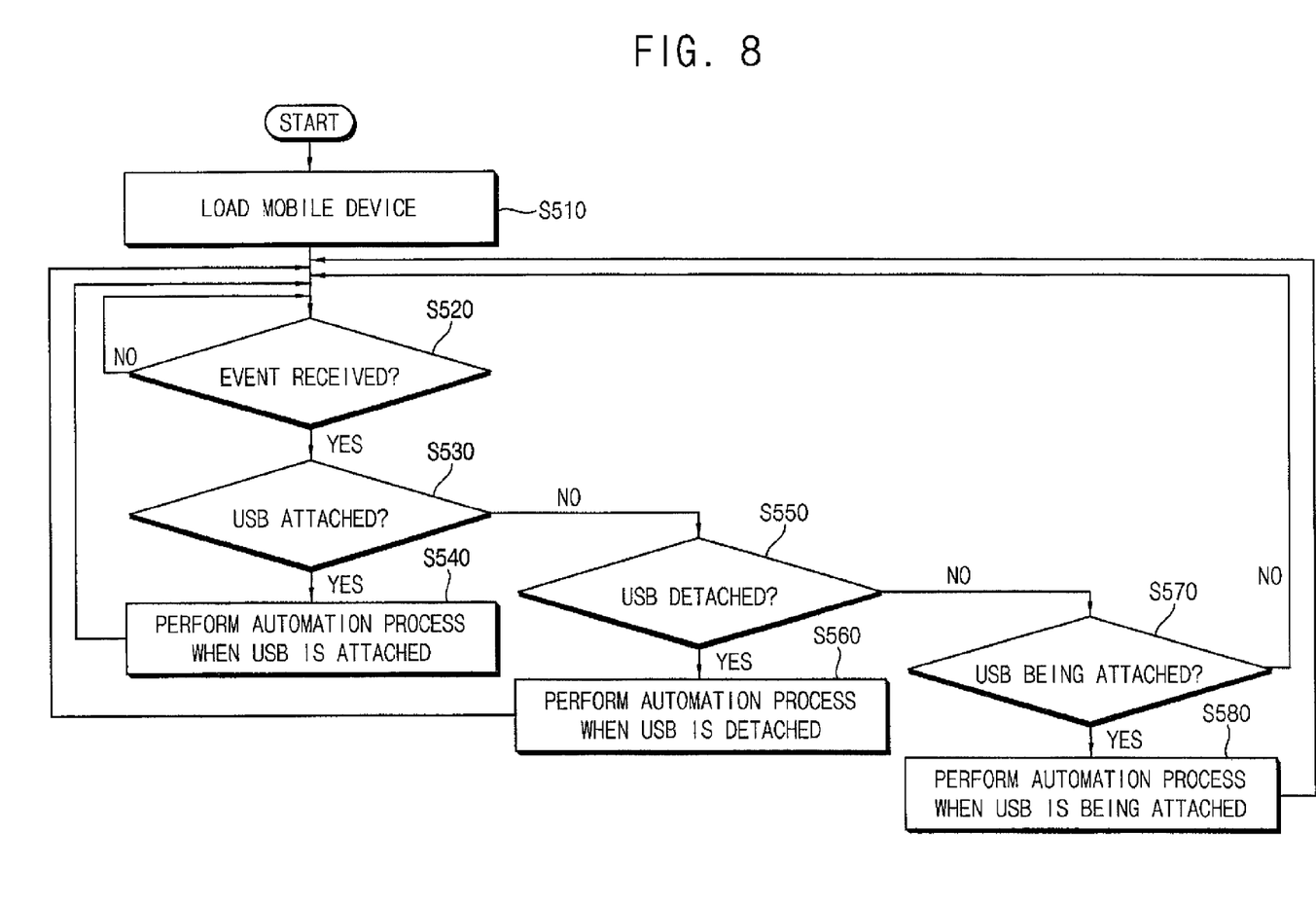
FIG. 8 is a flow chart illustrating an operation method of the mobile device according to an exemplary embodiment of the inventive concept.

FIG. 8 is a flow chart illustrating an operation method of the mobile device according to an exemplary embodiment of the inventive concept.

Hereinafter, the operation of the mobile device will be described with reference to FIGS. 2 through 8.

At block S5510, the USB composite processing unit 220 detects that the mobile device 200 is loaded. At block S520, the device controller driver 270 determines whether event information according to the connection status with the host has been received. Once the device controller 270 has received the event information, the automation processing logic module 260 determines whether the received event information corresponds to a first event indicating that the mobile device 200 is connected to the host (block S530).

At block S530, when the received event information corresponds to the first event received, the automation processing logic module 260 selects the automated operation corresponding to the first event from the automated operation table 240, and transfers the selected automated operation to the HID emulator 231 as the HID data. At block S540, the automated operation corresponding to the first event is executed, and the device controller driver 270 determines whether additional event information corresponding to another event has been received at block S520.

At block S530, when the received event information does not correspond to the first event received, the automation processing logic module 260 determines whether the received event information corresponds to a second event indicating that the mobile device 200 is disconnected from the host at block S550. When the received event information is the second event, the automation processing logic module 260 selects the automated operation corresponding to the second event from the automated operation table 240, and transfers the selected automated operation to the HID emulator 231 as the HID data. At block S560, the automated operation corresponding to the second event is executed, and the device controller driver 270 determines whether additional event information corresponding to another event has been received at block S520.

At block S550, when the received event information does not correspond to the second event received, the automation processing logic module 260 determines whether the received event information corresponds to a third event indicating that the mobile device 200 is in the process of being connected to the host at block S570. When the received event information corresponds to the third event, the automation processing logic module 260 selects the automated operation corresponding to the third event from the automated operation table 240, and transfers the selected automated operation to the HID emulator 231 as the HID data. At block S580, the automated operation corresponding to the third event is executed, and the device controller driver 270 determines whether additional event information corresponding to another event has been received at block S520.

The operations described with reference to FIG. 8 may be performed in the USB composite processing unit 220.

Figure 9:
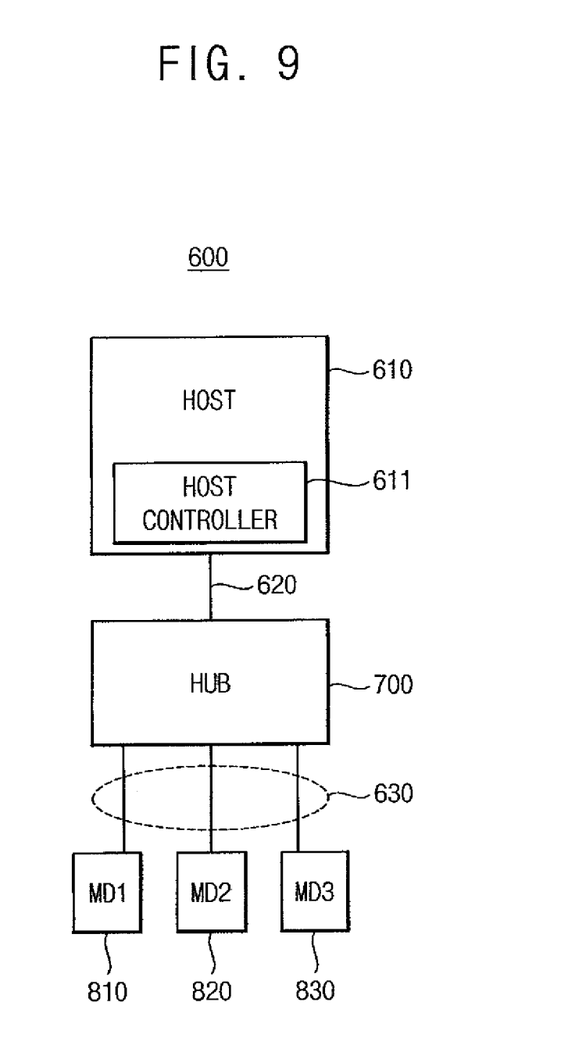
FIG. 9 is a block diagram illustrating a USB system according to an exemplary embodiment of the inventive concept.

FIG. 9 is a block diagram illustrating a USB system according to an exemplary embodiment of the inventive concept.

Referring to FIG. 9, a USB system includes a host 610, a hub 700 and a plurality of mobile devices 810, 820 and 830.

The host 610 and the hub 700 may be connected to each other via a first USB interface 620, and a host controller 611 in the host 610 controls the first USB interface 620. The hub 700 controls the connection between the host 610 and the mobile devices 810, 820 and 830. The hub 700 and the mobile devices 810, 820 and 830 are connected to each other via a second USB interface 630. Each of the mobile devices 810, 820 and 830 may have the same configuration, or substantially the same configuration as the mobile device 200 of FIG. 2. For example, each of the mobile devices 810, 820 and 830 may provide a plurality of USB functions including an HID emulator function, and each of the mobile devices 810, 820 and 830 may perform an automated operation(s) according to at least one activated function and the connection status with the host.

Figure 10:
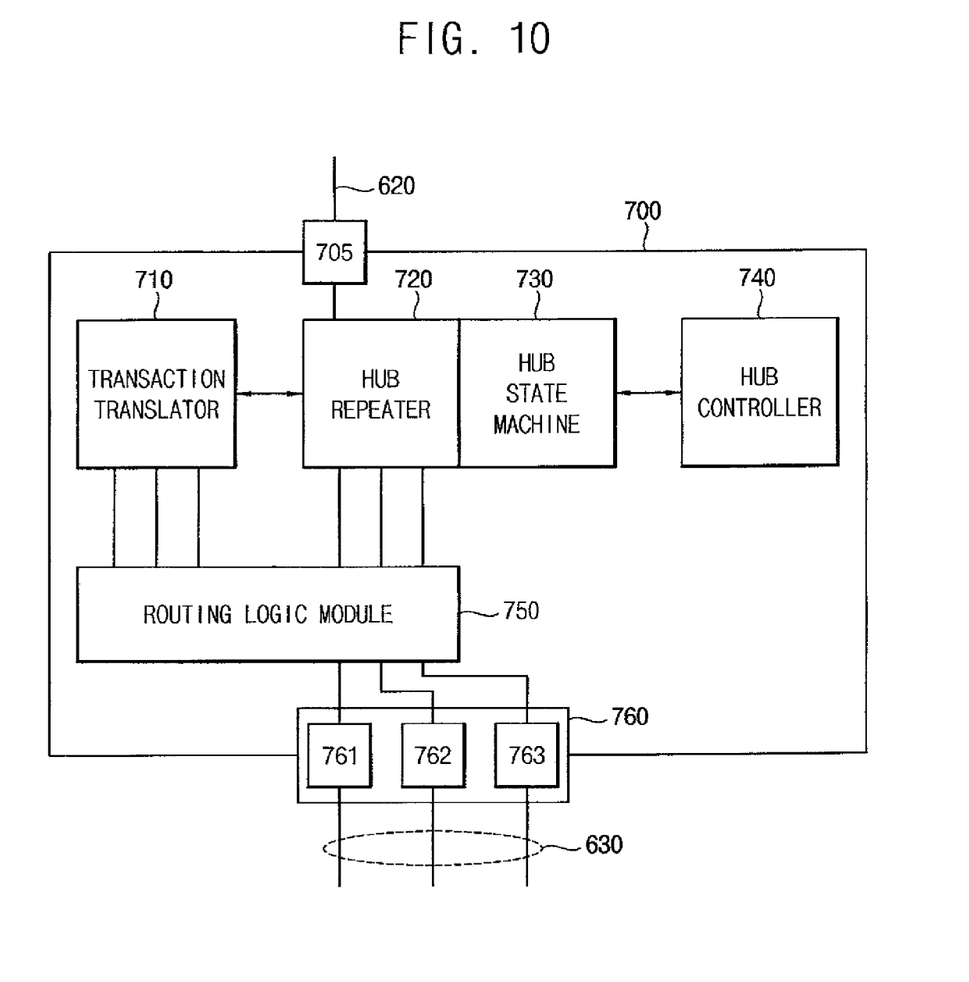
FIG. 10 is a block diagram illustrating an example of the hub in FIG. 9 according to an exemplary embodiment of the inventive concept.

FIG. 10 is a block diagram illustrating an example of the hub in FIG. 9 according to an exemplary embodiment of the inventive concept.

Referring to FIG. 10, a hub 700 includes a transaction translator 710, a hub repeater 720, a hub state machine 730, a hub controller 740 and a routing logic module 750. The hub 700 is connected to the host 610 through an upstream port 705, and is connected to the mobile devices 810, 820 and 830 through a downstream port unit 760. The downstream port unit 760 includes downstream ports 761, 762 and 763 each connected to one of the mobile devices 810, 820 and 830.

The hub repeater 720 is utilized for connectivity setup and teardown. The hub repeater 720 also supports exception handling such as, for example, bus fault detection and recovery and connect/disconnect detection. The hub controller 740 provides the mechanism for host-to-hub communication. The transaction translator 710 responds to high-speed split transactions and translates them to full-/low-speed transactions with full-/low-speed devices attached on downstream ports 761, 762 and 763. The operating speed of the hub 700 is the same, or substantially the same as the operating speed of the upstream port 705. The transaction translator 710 takes high-speed split transactions and translates them to full-/low-speed transactions. The hub controller 740 provides status and control functions, and permits host access to the hub 700. The operating speed of a device attached on the downstream ports 761, 762 and 763 determines whether the routing logic module 750 connects a port to the transaction translator 710 or the hub repeater 720.

For example, when the upstream port 705 is attached to an electrical environment that is operating at full-/low-speed, the hub's high-speed functionality is disabled. For example, the hub 700 may only operate at full-/low-speed, and the transaction translator 710 and the high-speed hub repeater 720 may not operate. In this electrical environment, the hub repeater 720 may operate as a full-/low-speed repeater, and the routing logic module 750 connects ports to the hub repeater 720. When the upstream port 705 is attached to an electrical environment that is operating at high-speed, the full-/low-speed hub repeater 720 may not be operational. In this electrical environment, when a high-speed device is attached on one of the downstream ports 761, 762 and 763, the routing logic module 750 may connect the port to the hub repeater 720, and the hub repeater 720 may operate as a high-speed repeater. In this case, when a full-/low-speed device is attached to one of the downstream ports 761, 762 and 763, the routing logic module 750 will connect the port to the transaction translator 710.

As described above, the mobile device including a plurality of USB functions performs an automated operation(s) according to at least one activated function, and the connection status with the host and related program is executed when the mobile device and the host are connected to each other via a USB connection. As a result, the load of the system may be reduced, and efficiency of the mobile device may be improved.

The inventive concept may be applied to various mobile applications according to exemplary embodiments of the inventive concept.

While the present inventive concept has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:
1. A mobile device, comprising:
a composite processing unit configured to provide a plurality of functions including a human interface device (HID) emulator function, select at least one activated function of the plurality of functions and corresponding automated operation content based on a connection status between the mobile device and a host, and generate client HID data including the automated operation content,
wherein the client HID data conforms to an HID protocol, and is generated by converting first HID data to the client HID data using the HID emulator function; and
a device controller driver configured to provide the client HID data to the host, and provide event information to the composite processing unit based on the connection status,
wherein the client HID data indicates to the host an automated operation to be automatically executed at the host in response to the host receiving the client HID data.

2. The mobile device of claim 1, wherein the device controller driver comprises:
a wired device controller driver configured to interface with the host via a wired interface; and
a wireless device controller driver configured to interface with the host via a wireless interface.

3. The mobile device of claim 1, wherein the plurality of functions include a plurality of universal serial port (USB) functions, and the device controller driver comprises a USB device controller driver configured to control a USB interface between the mobile device and the host.

4. A mobile device, comprising:
a composite processing unit configured to provide a plurality of functions including a human interface device (HID) emulator function, select at least one activated function of the plurality of functions and corresponding automated operation content based on a connection status between the mobile device and a host, and generate client HID data including the automated operation content; and
a device controller driver configured to provide the client HID data to the host, and provide event information to the composite processing unit based on the connection status,
wherein the composite processing unit comprises:
a function module comprising an HID emulator and configured to provide the plurality of functions;
an automated operation table comprising host automated operation content and client automated operation content corresponding to the at least one activated function, and based on the connection status;
a data transfer logic module configured to transfer the automated operation content as first HID data to the HID emulator; and
an automation processing logic module configured to control the function module and the data transfer logic module, and access the automated operation table, according to the connection status,
wherein the HID emulator is configured to convert the first HID data to the client HID data and provide the client HID data to the device controller driver.

5. The mobile device of claim 4, wherein the automated operation table comprises:
a plurality of function identifications, each corresponding to one of the plurality of functions; and
a plurality of status identifications based on the connection status.

6. The mobile device of claim 4, wherein the data transfer logic module is configured to provide the automated operation content as the first HID data to the HID emulator based on the automated operation table and the connection status.

7. The mobile device of claim 4, further comprising:
an input processing unit configured to convert an input to second HID data and provide the second HID data to the composite processing unit, wherein the HID emulator is configured to convert the first and second HID data to the client HID data.

8. The mobile device of claim 4, wherein the event information comprises first event information indicating that the mobile device is connected to the host, second event information indicating that the mobile device is disconnected from the host, or third event information indicating that the mobile device is in a process of being connected to the host.

9. The mobile device of claim 8, wherein the composite processing unit is configured to execute an automated operation corresponding to the first event information based on the automated operation table, upon the composite processing unit receiving the first event information.

10. The mobile device of claim 8, wherein the composite processing unit is configured to execute an automated operation corresponding to the second event information based on the automated operation table, upon the composite processing unit receiving the second event information.

11. The mobile device of claim 8, wherein the composite processing unit is configured to execute an automated operation corresponding to the third event information based on the automated operation table, upon the composite processing unit receiving the third event information.

12. A universal serial bus (USB) system, comprising:
a mobile device; and
a host connected to the mobile device via a USB interface, wherein the mobile device comprises:
a composite processing unit configured to provide a plurality of USB functions including a human interface device (HID) emulator function, select at least one activated USB function of the plurality of USB functions and corresponding automated operation content based on a connection status between the mobile device and the host, and generate client HID data including the automated operation content,
wherein the client HID data conforms to an HID protocol, and is generated by converting first HID data to the client HID data using the HID emulator function; and
a device controller driver configured to provide the client HID data to the host, and provide event information to the composite processing unit based on the connection status,
wherein the client HID data indicates to the host an automated operation to be automatically executed at the host in response to the host receiving the client HID data.

13. The USB system of claim 12, wherein the host comprises:
a USB host controller configured to control the USB interface;
a USB host controller driver configured to control the USB host controller; and
a device driver unit comprising a plurality of device drivers, each corresponding to one of the plurality of USB functions, wherein a device driver of the plurality of device drivers corresponding to an activated function is executed upon connecting the mobile device and the host.

14. The USB system of claim 12, wherein the mobile device is one of a smartphone, a personal digital assistant (PDA), a personal multimedia player and a tablet personal computer (PC).

15. The USB system of claim 12, wherein the USB interface is a wired USB interface, or a wireless ultra wide band (UWB) USB interface.

16. A composite processing unit, comprising:
a function module configured to provide a plurality of functions including a human interface device (HID) emulator function, select at least one activated function of the plurality of functions and corresponding automated operation content based on a connection status with a host device, and generate client HID data including the automated operation content,
wherein the client HID data conforms to an HID protocol;
an automated operation table comprising host automated operation content and client automated operation content corresponding to the at least one activated function, and based on the connection status;
a data transfer logic module configured to transfer the automated operation content as first HID data to the function module; and
an automation processing logic module configured to control the function module and the data transfer logic module, and access the automated operation table, according to the connection status,
wherein the function module is configured to convert the first HID data to the client HID data using the HID emulator function, and output the client HID data,
wherein the client HID data indicates to the host device an automated operation to be automatically executed at the host device in response to the host device receiving the client HID data.

17. The composite processing unit of claim 16, wherein the automated operation table comprises:
a plurality of function identifications, each corresponding to one of the plurality of functions; and
a plurality of status identifications based on the connection status.

18. The composite processing unit of claim 16, wherein the plurality of functions include a plurality of universal serial port (USB) functions.

19. The composite processing unit of claim 16, wherein the function module comprises an HID emulator configured to provide the HID emulator function.

20. The composite processing unit of claim 19, wherein the data transfer logic module is configured to provide the automated operation content as the first HID data to the HID emulator based on the automated operation table and the connection status.

* * * * *